United States Patent
Shimizu (10) Patent No.: US 10,209,860 B2
(45) Date of Patent: Feb. 19, 2019

(54) DISPLAY INPUT DEVICE CAPABLE OF DETECTING OPERATION PERFORMED ON DISPLAY PORTION, IMAGE PROCESSING APPARATUS, DISPLAY INPUT METHOD

(71) Applicant: KYOCERA Document Solutions Inc., Osaka-shi, Osaka (JP)

(72) Inventor: Takeo Shimizu, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 302 days.

(21) Appl. No.: 15/364,724

(22) Filed: Nov. 30, 2016

(65) Prior Publication Data
US 2017/0160902 A1    Jun. 8, 2017

(30) Foreign Application Priority Data
Dec. 2, 2015 (JP) ................. 2015-236058

(51) Int. Cl.
| | | |
|---|---|---|
| *G06F 3/0481* | (2013.01) | |
| *G06F 3/0488* | (2013.01) | |
| *H04N 1/00* | (2006.01) | |

(52) U.S. Cl.
CPC ........ *G06F 3/04817* (2013.01); *G06F 3/0488* (2013.01); *G06F 3/04886* (2013.01); *H04N 1/0044* (2013.01); *H04N 1/00411* (2013.01); *H04N 1/00424* (2013.01); *H04N 1/00432* (2013.01); *H04N 2201/0094* (2013.01)

(58) Field of Classification Search
CPC ............... G06F 3/04817; G06F 3/0488; G06F 3/04886; H04N 1/00424; H04N 1/00432; H04N 1/0044
See application file for complete search history.

(56) References Cited

U.S. PATENT DOCUMENTS

| | | | | |
|---|---|---|---|---|
| 8,019,390 B2 * | 9/2011 | Sindhu | ................. | G06F 1/1613 345/158 |
| 2009/0204923 A1 * | 8/2009 | Tachibana | .......... | H04N 1/00204 715/771 |
| 2010/0262928 A1 * | 10/2010 | Abbott | ................ | G06F 3/04817 715/769 |

(Continued)

FOREIGN PATENT DOCUMENTS

JP     2011124688 A     6/2011

*Primary Examiner* — Anil K Bhargava
(74) *Attorney, Agent, or Firm* — Alleman Hall Creasman & Tuttle LLP (57) ABSTRACT

A display input device includes an operation display portion and a control portion. The operation display portion includes a display portion and an operation detecting portion, the operation detecting portion being configured to detect an operation performed on the display portion. The control portion executes a first display step, a second display step, an identification step, and a display position setting step. In the first display step, an icon display area in which a plurality of operation icons are arranged is displayed on the display portion. In the second step, a keyboard is displayed on the display portion. In the identification step, operated icons are identified. In the display position setting step, a display position of the keyboard displayed in the second display step, is set to such a position where the keyboard is overlapped on a part or whole of at least one of the operated icons.

7 Claims, 6 Drawing Sheets

(56) References Cited

U.S. PATENT DOCUMENTS

2011/0302520 A1* 12/2011 Yuasa ................ G06F 3/04886
715/773
2015/0074575 A1* 3/2015 Jeon .................... G06F 3/04886
715/768

* cited by examiner

DISPLAY INPUT DEVICE CAPABLE OF DETECTING OPERATION PERFORMED ON DISPLAY PORTION, IMAGE PROCESSING APPARATUS, DISPLAY INPUT METHOD

INCORPORATION BY REFERENCE

This application is based upon and claims the benefit of priority from the corresponding Japanese Patent Application No. 2015-236058 filed on Dec. 2, 2015, the entire contents of which are incorporated herein by reference.

BACKGROUND

The present disclosure relates to a display input device, an image processing apparatus including a display input device, and a display input method executed in a display input device.

An image processing apparatus such as a printer may include an operation display portion that includes a display portion and an operation detecting portion, wherein the operation detecting portion is configured to detect an operation performed on the display portion. For example, in this type of image processing apparatus, an icon display area is displayed, wherein a plurality of operation icons corresponding to functions of the image processing apparatus are arranged in the icon display area. In the image processing apparatus, among the operation icons arranged in the icon display area displayed on the display portion, a desired operation icon is operated so as to set a function of the image processing apparatus.

In addition, in the image processing apparatus, a keyboard such as a ten-key pad may be displayed on the display portion. For example, in a case where a setting is to be made with a numerical input, the keyboard is displayed on the display portion in response to a user's call operation.

SUMMARY

A display input device according to an aspect of the present disclosure includes an operation display portion and a control portion. The operation display portion includes a display portion and an operation detecting portion, the operation detecting portion being configured to detect an operation performed on the display portion. The control portion includes a CPU. The control portion executes a first display step, a second display step, an identification step, and a display position setting step. In the first display step, the control portion displays, on the display portion, an icon display area in which a plurality of operation icons are arranged. In the second display step, when a predetermined call operation is performed, the control portion displays, on the display portion, a keyboard in a state of being overlapped on a part of the icon display area. In the identification step, the control portion identifies, among the plurality of operation icons arranged in the icon display area, one or more operated icons that were already operated during a predetermined operation period. In the display position setting step, in a case where there are one or more operated icons among the plurality of operation icons arranged in the icon display area, the control portion sets either one or both of: display positions of the plurality of operation icons displayed in the first display step; and a display position of the keyboard displayed in the second display step, to such positions where the keyboard is overlapped on a part or whole of at least one of the operated icons.

An image processing apparatus according to another aspect of the present disclosure includes the display input device and either one or both of an image reading portion and an image forming portion. The image reading portion is configured to read image data from a document sheet. The image forming portion is configured to form an image based on image data. The operation icons are used to set contents of processes that are executed by either one or both of the image reading portion and the image forming portion.

A display input method according to a further aspect of the present disclosure is executed in a display input device including an operation display portion that includes a display portion and an operation detecting portion, the operation detecting portion being configured to detect an operation performed on the display portion. The display input method includes a first step, a second step, a third step, and a fourth step. In the first step, an icon display area in which a plurality of operation icons are arranged is displayed on the display portion. In the second step, when a predetermined call operation is performed, a keyboard in a state of being overlapped on a part of the icon display area is displayed on the display portion. In the third step, among the plurality of operation icons arranged in the icon display area, one or more operated icons that were already operated during a predetermined operation period are identified. In the fourth step, in a case where there are one or more operated icons among the plurality of operation icons arranged in the icon display area, either one or both of: display positions of the plurality of operation icons displayed in the first display step; and a display position of the keyboard displayed in the second display step, are set to such positions where the keyboard is overlapped on a part or whole of at least one of the operated icons.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the attached drawings for the understanding of the present disclosure. It should be noted that the following embodiment is an example of a specific embodiment of the present disclosure and should not limit the technical scope of the present disclosure.

[Outlined Configuration of Image Processing Apparatus 10]

Figure 1:
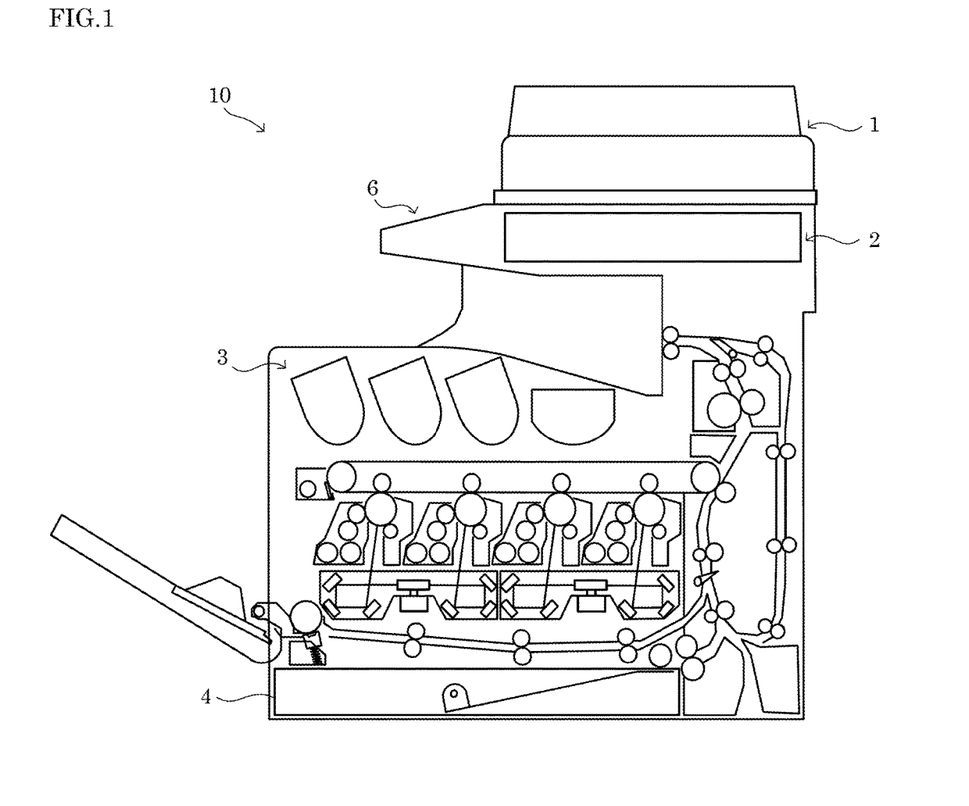
FIG. 1 is a diagram showing a configuration of an image processing apparatus according to an embodiment of the present disclosure.

First, an outlined configuration of an image processing apparatus 10 according to an embodiment of the present disclosure is described with reference to FIG. 1 to FIG. 3. Here, FIG. 1 is a schematic cross-sectional view showing the configuration of the image processing apparatus 10. FIG. 3 is a schematic plan view showing the configuration of an operation/display portion 6.

The image processing apparatus 10 is a multifunction peripheral having a plurality of functions such as a scan function for reading image data from a document sheet, a print function for forming an image based on the image data, a facsimile function, and a copy function. It is noted that the present disclosure is applicable to image processing apparatuses such as a scanner device, a printer device, a facsimile device, and a copier.

Figure 2:
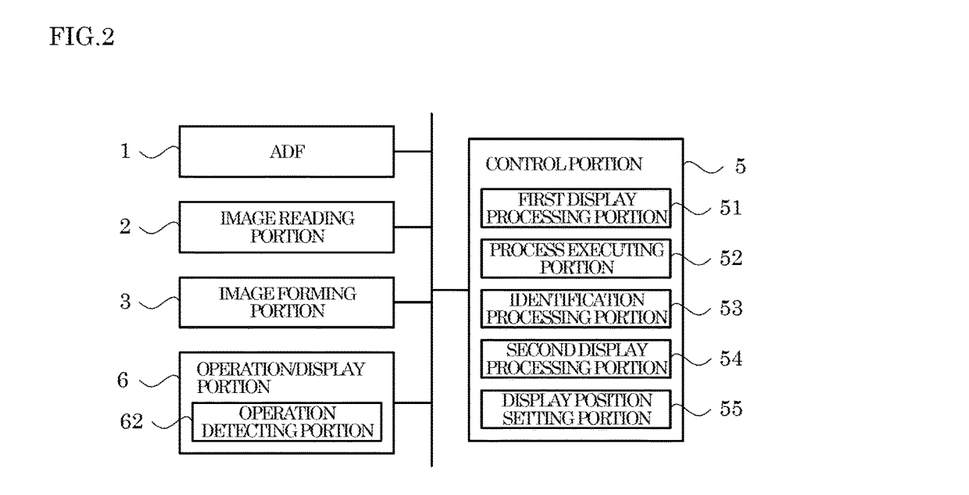
FIG. 2 is a block diagram showing a system configuration of the image processing apparatus according to the embodiment of the present disclosure.
Figure 3:
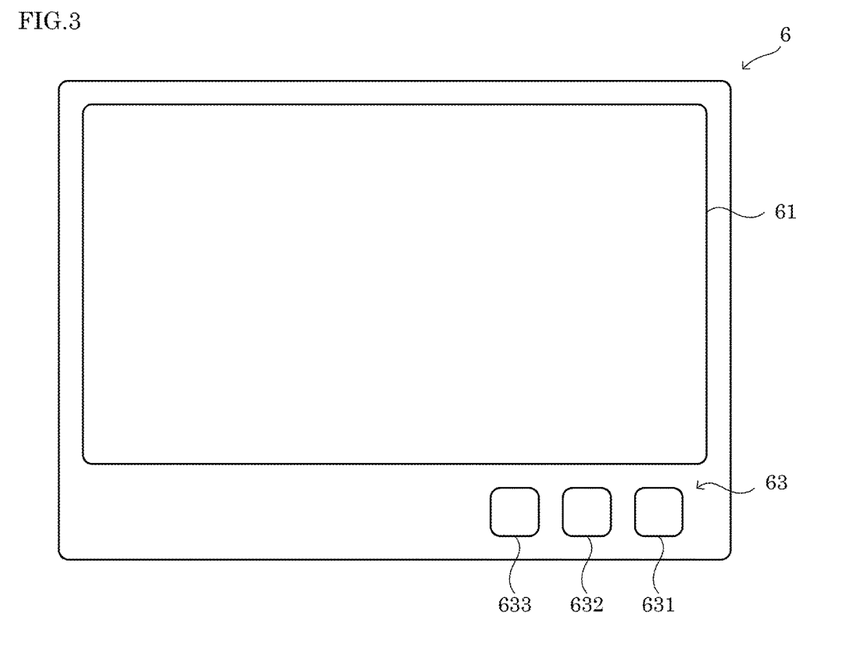
FIG. 3 is a diagram showing a configuration of an operation/display portion of the image processing apparatus according to the embodiment of the present disclosure.

As shown in FIG. 1 and FIG. 2, the image processing apparatus 10 includes an ADF (Auto Document Feeder) 1, an image reading portion 2, an image forming portion 3, a sheet feed portion 4, a control portion 5, and the operation/display portion 6.

The ADF 1 is an automatic document feeding device that includes a document sheet setting portion, a plurality of conveyance rollers, a document sheet pressing, and a sheet discharge portion, and conveys a document sheet so that it is read by the image reading portion 2. The image reading portion 2 includes a document sheet table, a light source, a plurality of mirrors, an optical lens, and a CCD (Charge Coupled Device), and is configured to read image data from a document sheet.

The image forming portion 3 is configured to execute an image forming process (print process) in which to form a color or monochrome image by an electrophotographic system, based on image data that was read by the image reading portion 2 or image data input from an external information processing apparatus such as a personal computer. Specifically, the image forming portion 3 includes a plurality of image forming units corresponding to C (cyan), M (magenta), Y (yellow), and K (black), a laser scanning unit (LSU), an intermediate transfer belt, a secondary transfer roller, a fixing device, and a sheet discharge tray. The sheet feed portion 4 supplies sheets to the image forming portion 3. In the image forming portion 3, a color or monochrome image is formed on a sheet supplied from the sheet feed portion 4, and the sheet with the image formed thereon is discharged to the discharge tray. It is noted that the image forming portion 3 may form an image by another image forming system such as an ink jet system.

The control portion 5 includes control equipment such as CPU, ROM, RAM, and EEPROM that are not shown. The CPU is a processor that executes various calculation processes. The ROM is a nonvolatile storage portion in which various information such as control programs for causing the CPU to execute various processes are stored in advance. The RAM is a volatile storage portion, and the EEPROM is a nonvolatile storage portion. The RAM and the EEPROM are used as temporary storage memory (working area) for the various processes executed by the CPU. In the control portion 5, the CPU executes the various control programs stored in advance in the ROM. This allows the image processing apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image processing apparatus 10.

The operation/display portion 6 is a user interface provided in the image processing apparatus 10. As shown in FIG. 2 and FIG. 3, the operation/display portion 6 includes a display portion 61, an operation detecting portion 62, and a hard key 63.

The display portion 61 displays various types of information based on control instructions from the control portion 5. For example, the display portion 61 is a liquid crystal display.

The operation detecting portion 62 is a so-called touch panel that can detect a user operation performed on the display portion 61. The operation detecting portion 62 is configured to, when an object such as a user's finger touches the display portion 61, detect a touch position on the display portion 61 by the resistance film system. It is noted that the operation detecting portion 62 may detect a touch of the object on the display portion 61 by another detection system such as the electrostatic capacity system.

The hard key 63 inputs various types of information to the control portion 5 in response to user operations. For example, as shown in FIG. 3, the hard key 63 includes a power source key 631, a start key 632, and a call key 633.

The power source key 631 is used for controlling the power supply to the portions of the image processing apparatus 10. For example, in the image processing apparatus 10, the power source key 631 is operated to switch the action mode of the image processing apparatus 10 between a normal mode and an energy-saving mode. For example, in the image processing apparatus 10, when the power source key 631 is operated, the action mode is switched from the energy-saving mode to the normal mode, and an initial screen is displayed on the display portion 61, wherein on the initial screen, it is possible to select a function of the image processing apparatus 10 from among the copy function, the print function, the scan function, the facsimile function and the like.

The start key 632 is used to input an instruction to execute a job, to the control portion 5. For example, in the image processing apparatus 10, when the user selects the copy function on the initial screen and operates the start key 632, a copy job is executed to print a document sheet placed on the document sheet setting portion of the ADF 1 or the document sheet table of the image reading portion 2.

The call key 633 is used to display a keyboard on the display portion 61. For example, the keyboard is a ten-key pad that is used to input letters, numerals, and/or signs.

An operation screen including an icon display area is displayed on the display portion 61, wherein a plurality of operation icons are arranged in the icon display area. For example, the operation icons are used to set details of the processes such as a copy job, a print job, a scan job, and a facsimile job that are executed by the image reading portion 2 and/or the image forming portion 3. In the image processing apparatus 10, functions of the image processing apparatus 10 are set by operating the operation icons arranged in the operation screen.

Figure 4:
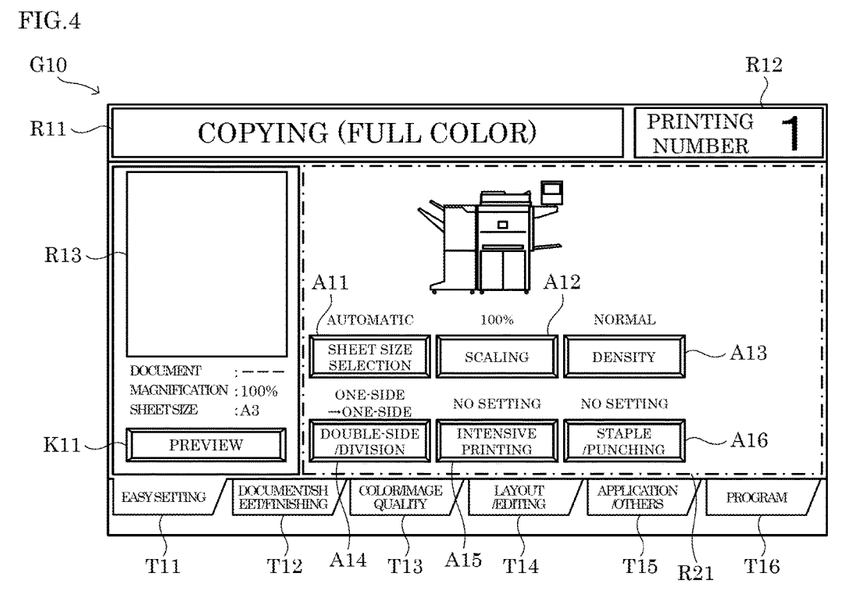
FIG. 4 is a diagram showing an example of an operation screen displayed on a display portion of the image processing apparatus according to the embodiment of the present disclosure.

FIG. 4 shows an example of the operation screen including the icon display area, displayed on the display portion 61. An operation screen G10 shown in FIG. 4 is used to set a function related to the copy job executed in the image processing apparatus 10. For example, the operation screen G10 is displayed when a user operation to select the copy function is performed on the initial screen.

As shown in FIG. 4, the operation screen G10 includes a message display field R11, a printing number input field R12, a preview display field R13, an icon display area R21, a preview display key K11, and display change tabs T11 to T16.

The message display field R11 displays a message to the user. The printing number input field R12 accepts an input of the number of prints to be printed in the copy job. The preview display field R13 displays a preview image of an image to be printed by the copy job. The preview display key K11 is used to display the preview image in the preview display field R13. A plurality of operation icons are arranged in the icon display area R21. As shown in FIG. 4, operation icons A11 to A16 are arranged in the icon display area R21 of the operation screen G10.

When any of the operation icons A11 to A16 is operated on the operation screen G10, a process corresponding to the operated operation icon is executed. For example, when the operation icon A11 is operated, a setting screen related to a sheet size selection function for the copy job is displayed on the display portion 61. It is noted that according to the operation screen G10 shown in FIG. 4, the sheet size selection function that can be set by operating the operation icon A11 has been set to "automatic" by operating the operation icon A11 or by the initial setting.

The display change tabs T11 to T16 are used to change the operation icons displayed on the display portion 61. In the image processing apparatus 10, operation icons related to the copy job are associated with one or more among the display change tabs T11 to T16. For example, the operation icon A12 is associated with the display change tabs T11 and T14. When any of the display change tabs T11 to T16 is operated on the operation screen G10, an operation screen including the icon display area in which one or more operation icons associated with the operated display change tab are arranged, is displayed on the display portion 61. It is noted that the operation icons A11 to A16 shown in FIG. 4 are operation icons associated with the display change tab T11.

Figure 5:
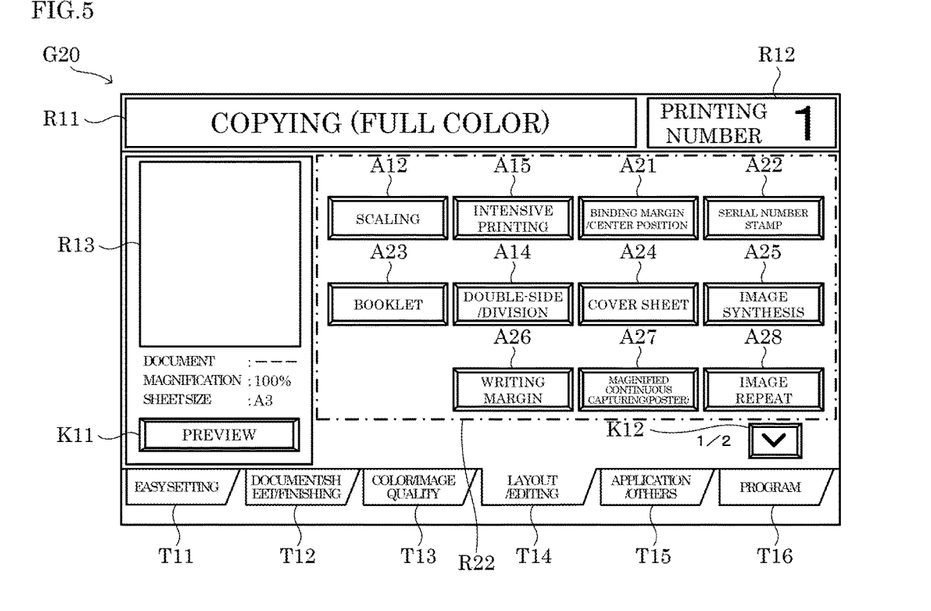
FIG. 5 is a diagram showing an example of the operation screen displayed on the display portion of the image processing apparatus according to the embodiment of the present disclosure.

FIG. 5 shows an example of the operation screen including the icon display area, wherein the operation screen of FIG. 5 is displayed on the display portion 61 when the display change tab T14 is operated on the operation screen G10. An operation screen G20 shown in FIG. 5 includes an icon display area R22 and a display change key K12. In addition, the operation screen G20 shown in FIG. 5, as is the case with the operation screen G10, includes the message display field R11, the printing number input field R12, the preview display field R13, the preview display key K11, and the display change tabs T11 to T16.

As shown in FIG. 5, operation icons A12, A14, A15, and A21 to A28 that are associated with the display change tab T14, are arranged in the icon display area R22 of the operation screen G20. The display change key K12 is displayed when the number of operation icons associated with the display change tab exceeds the limit number of operation icons that can be displayed in the icon display area. When the display change key K12 is operated on the operation screen G20, another operation screen is displayed on the display portion 61, wherein the other operation screen includes an icon display area in which, among all of the operation icons associated with the display change tab T14, operation icons that are not displayed in the current operation screen G20, are arranged.

Figure 6:
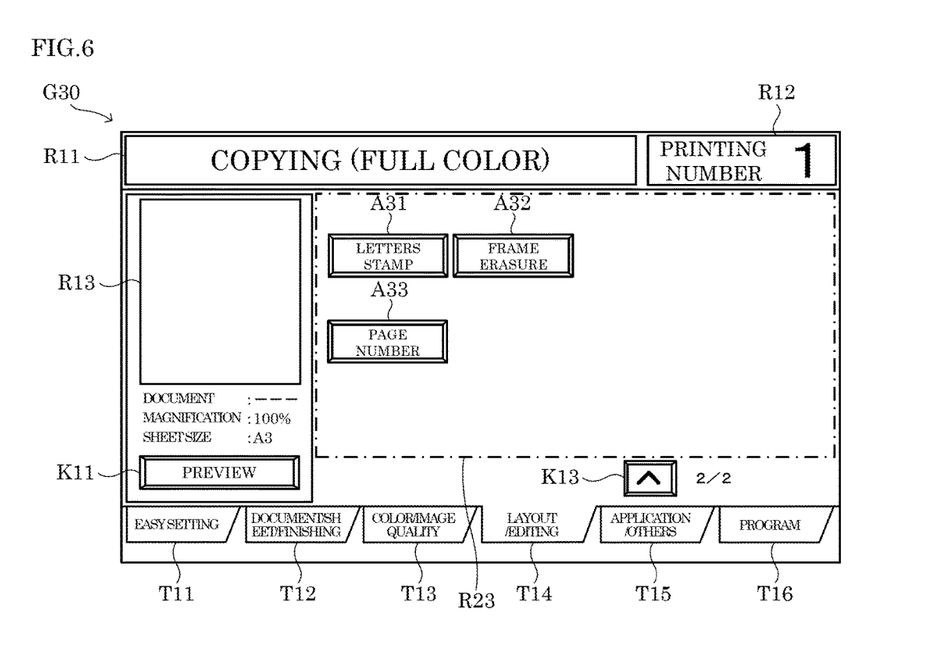
FIG. 6 is a diagram showing an example of the operation screen displayed on the display portion of the image processing apparatus according to the embodiment of the present disclosure.

FIG. 6 shows an example of the operation screen including the icon display area, wherein the operation screen of FIG. 6 is displayed on the display portion 61 when the display change key K12 is operated on the operation screen G20. An operation screen G30 shown in FIG. 6 includes an icon display area R23 and a display change key K13. In addition, the operation screen G30 shown in FIG. 6, as is the case with the operation screen G10, includes the message display field R11, the printing number input field R12, the preview display field R13, the preview display key K11, and the display change tabs T11 to T16.

As shown in FIG. 6, operation icons A31 to A33 that are associated with the display change tab T14, are arranged in the icon display area R23 of the operation screen G30. When the display change key K13 is operated on the operation screen G30, the screen displayed on the display portion 61 is switched from the operation screen G30 to the operation screen G20.

Meanwhile, in a case where the user operates the call key 633 and the keyboard is displayed on the display portion 61, there may be a case where the keyboard is inevitably displayed in a state of being overlapped on any of the operation icons arranged in the icon display area, due to the layout of the screen displayed on the display portion 61. In that case, when the displayed keyboard is overlapped on an operation icon that the user desires to operate, the user needs to perform an operation for displacing the keyboard, or an operation for ending the display of the keyboard once, so as to operate the operation icon hidden under the keyboard. On the other hand, the image processing apparatus 10 according to the embodiment of the present disclosure, as described below, reduces troublesome user operation when the keyboard is displayed on the display portion 61.

Specifically, a display control program for causing the CPU to execute an operation screen display process (see the flowchart of FIG. 7) that is described below, is stored in the ROM of the control portion 5 in advance. It is noted that the display control program may be recorded on a computer-readable recording medium such as a CD, a DVD, or a flash memory, and read from the recording medium and installed into a storage portion, such as the EEPROM, of the control portion 5.

As shown in FIG. 2, the control portion 5 includes a first display processing portion 51, a process executing portion 52, an identification processing portion 53, a second display processing portion 54, and a display position setting portion 55. Specifically, the control portion 5 executes the display control program stored in the ROM by using the CPU. This allows the control portion 5 to function as the first display processing portion 51, the process executing portion 52, the identification processing portion 53, the second display processing portion 54, and the display position setting portion 55. Here, a device including the control portion 5 and the operation/display portion 6 is an example of the display input device of the present disclosure.

The first display processing portion 51 displays, on the display portion 61, an operation screen including an icon display area in which a plurality of operation icons are arranged.

For example, when the user selects the copy function on the initial screen displayed on the display portion 61, the first display processing portion 51 displays the operation screen G10 including the icon display area R21 in which the operation icons A11 to A16 related to the copy job are arranged, as shown in FIG. 4.

In addition, when the display change tab T14 is operated on the operation screen G10 displayed on the display portion 61, the first display processing portion 51 displays the operation screen G20 including the icon display area R22 in which the operation icons A12, A14, A15, and A21 to A28 related to the copy job are arranged, as shown in FIG. 5.

In addition, when the display change key K12 is operated on the operation screen G20 displayed on the display portion 61, the first display processing portion 51 displays the operation screen G30 including the icon display area R23 in which the operation icons A31 to A33 related to the copy job are arranged, as shown in FIG. 6. Here, the operation icons A11 to A16, the operation icons A21 to A28, and the operation icons A31 to A33 are an example of the operation icons of the present disclosure.

When the operation detecting portion 62 has detected that an operation was performed on an operation icon, the process executing portion 52 executes a process corresponding to the operated operation icon.

Specifically, when a touch position detected by the operation detecting portion 62 at which the display portion 61 is touched by the object, overlaps one of the operation icons arranged in the icon display area, the process executing portion 52 executes a process corresponding to the operation icon that overlaps the touch position.

For example, when the operation detecting portion 62 has detected that an operation was performed on an operation icon, the process executing portion 52 displays, on the display portion 61, a setting screen that is used to perform a setting operation of setting a function corresponding to the operated operation icon. For example, when it is detected that the operation icon A11 was operated on the operation screen G10 shown in FIG. 4, the process executing portion 52 displays a setting screen related to the sheet size selection function, on the display portion 61. Here, the process executing portion 52 that executes a process of displaying the setting screen on the display portion 61, is an example of the third display processing portion of the present disclosure.

It is noted that the process executing portion 52 may execute a process of changing the setting for the function corresponding to the operated operation icon each time the operation detecting portion 62 detects an operation performed on an operation icon. For example, each time an operation performed on the operation icon A11 is detected on the operation screen G10 shown in FIG. 4, the process executing portion 52 changes the setting of the sheet size selection function among "automatic", "A4", and "A3" in the stated order.

The identification processing portion 53 identifies, among the plurality of operation icons arranged in the icon display area, operated icons that were already operated during a predetermined operation period.

For example, the identification processing portion 53 identifies the operated icons based on whether or not a setting operation was performed on the setting screen displayed by the process executing portion 52.

For example, in the image processing apparatus 10, operation status information such as flags indicating the operation status of the operation icons, is stored in a predetermined storage area of the RAM. It is noted that the initial value of each piece of operation status information is a value indicating "unoperated". When a setting change operation for changing the setting of a function is performed on the setting screen, the identification processing portion 53 rewrites a value of a piece of operation status information stored in the RAM corresponding to the operated operation icon, to a value indicating "operated". With this configuration, among the plurality of operation icons, operated icons are identified.

It is noted that the identification processing portion 53 may identify each operated icon based on whether or not an operation performed on the operation icon was detected by the operation detecting portion 62.

For example, the operation period is from a time when the first display processing portion 51 starts to display the operation screen including the icon display area, to a time when an execution instruction for a job on which a function is set on the operation screen, is received. In addition, the operation period may be from a start to an end of a display of the operation screen including the icon display area performed by the first display processing portion 51. In addition, the operation period may be from a start of a display of the operation screen including the icon display area performed by the first display processing portion 51, to a time when a predetermined wait time has elapsed.

For example, each time the operation period elapses, the identification processing portion 53 resets the values held in the operation status information stored in a predetermined storage area of the RAM, to the initial value.

The second display processing portion 54, when a predetermined call operation is performed, displays the keyboard in a state of being overlapped on a part of the icon display area, on the display portion 61.

For example, when the call key 633 is operated during a display of the operation screen, the second display processing portion 54 displays the keyboard in a state of being overlapped on a part of the icon display area, on the display portion 61. Here, the operation of the call key 633 is an example of the predetermined call operation of the present disclosure.

It is noted that, when an operation is performed on a predetermined image such as the printing number input field R12 displayed on the display portion 61, the second display processing portion 54 may display the keyboard in a state of being overlapped on a part of the icon display area, on the display portion 61. In this case, the operation performed on the predetermined image displayed on the display portion 61 is another example of the predetermined call operation of the present disclosure.

For example, the second display processing portion 54 displays the keyboard within the icon display area. It is noted that a part of the keyboard displayed by the second display processing portion 54 may protrude from the icon display area.

The display position setting portion 55 is configured to, when there are one or more operated icons among the plurality of operation icons arranged in the icon display area, set the display position of the keyboard displayed by the second display processing portion 54 to a position where the keyboard is overlapped on a part or the whole of at least one of the operated icons.

Specifically, when the keyboard is inevitably displayed in a state of being overlapped on any of the operation icons arranged in the icon display area, the display position setting portion 55 sets the display position of the keyboard displayed by the second display processing portion 54 to a position where the keyboard is overlapped on a part or the whole of at least one of the operated icons.

For example, when there are one or more operated icons among the plurality of operation icons arranged in the icon display area, the display position setting portion 55 sets the display position of the keyboard displayed by the second display processing portion 54 to a position where the smallest number of unoperated icons are overlapped, in part or wholly, with the keyboard. It is noted that when there are one or more operated icons among the plurality of operation icons arranged in the icon display area, the display position setting portion 55 may set the display position of the keyboard displayed by the second display processing portion 54 to a position where the largest number of operated icons are overlapped, in part or wholly, with the keyboard.

In a case where the keyboard is inevitably displayed in a state of being overlapped on any of the operation icons arranged in the icon display area, and there is no operated icon among the plurality of operation icons arranged in the icon display area, the display position setting portion 55 sets the display position of the keyboard displayed by the second display processing portion 54 to a position where the smallest number of operation icons are overlapped, in part or wholly, with the keyboard.

It is noted that when there are one or more operated icons among the plurality of operation icons arranged in the icon display area, the display position setting portion 55 may set the display positions of the plurality of operation icons displayed by the first display processing portion 51 to such positions where the keyboard is overlapped on a part or the whole of at least one of the operated icons. For example, when there are one or more operated icons among the plurality of operation icons arranged in the icon display area, the display position setting portion 55 may set the display positions of the plurality of operation icons displayed by the first display processing portion 51 to such positions where the smallest number of unoperated icons are overlapped, in part or wholly, with the keyboard.

In addition, when there are one or more operated icons among the plurality of operation icons arranged in the icon display area, the display position setting portion 55 may set both the display positions of the plurality of operation icons displayed by the first display processing portion 51 and the display position of the keyboard displayed by the second display processing portion 54, to such positions where the keyboard is overlapped on a part or the whole of at least one of the operated icons. For example, when there are one or more operated icons among the plurality of operation icons arranged in the icon display area, the display position setting portion 55 may set both the display positions of the plurality of operation icons displayed by the first display processing portion 51 and the display position of the keyboard displayed by the second display processing portion 54, to such positions where the smallest number of unoperated icons are overlapped, in part or wholly, with the keyboard.

[Operation Screen Display Process]

Figure 7:
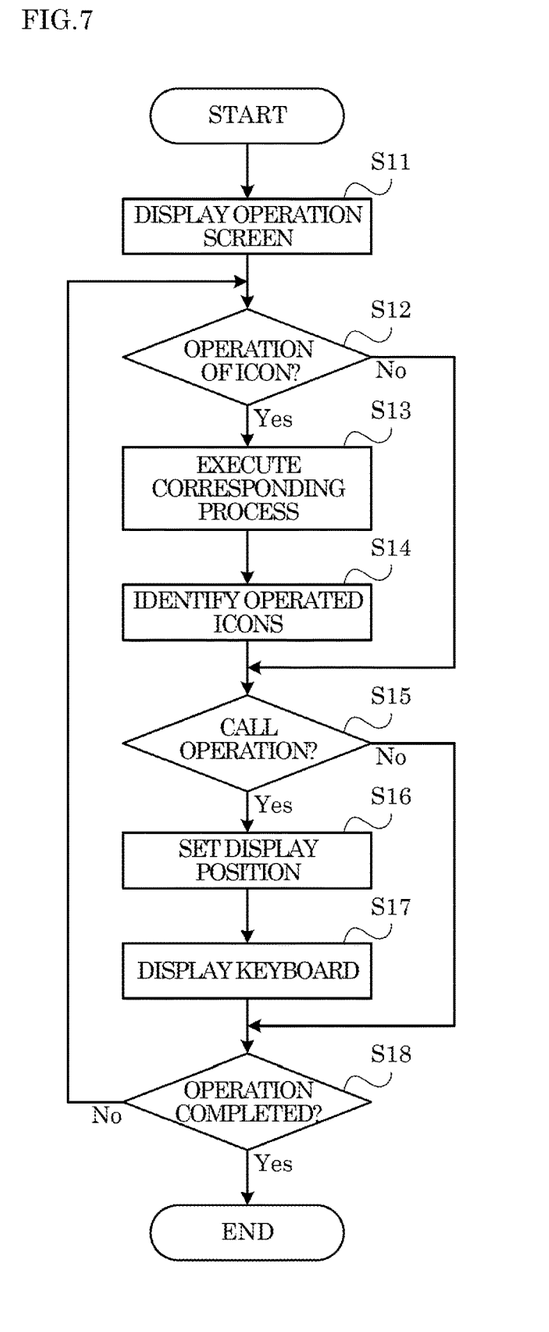
FIG. 7 is a flowchart showing an example of an operation screen display process executed in the image processing apparatus according to the embodiment of the present disclosure.

In the following, with reference to FIG. 7, a description is given of an example of the procedure of the operation screen display process executed by the control portion 5 in the image processing apparatus 10. Here, steps S11, S12, . . . represent numbers assigned to the processing procedures (steps) executed by the control portion 5. It is noted that the operation screen display process is executed, for example, when the user performs an operation of selecting any function of the image processing apparatus 10 on the initial screen, when any of the display change tabs T12 to T16 is operated on the operation screen G10, or when the display change key K12 is operated on the operation screen G20.

It is noted that in the following description, it is supposed that there is no operated icon among the plurality of operation icons arranged in the icon display area R21 of the operation screen G10 shown in FIG. 4. In addition, in the following description, it is supposed that among the plurality of operation icons arranged in the icon display area R22 of the operation screen G20 shown in FIG. 5, operation icons A12, A15, and A21 to A22 were identified as operated icons by the identification processing portion 53. In addition, in the following description, it is supposed that there is no operated icon among the plurality of operation icons arranged in the icon display area R23 of the operation screen G30 shown in FIG. 6.

<Step S11>

First, in step S11, the control portion 5 displays, on the display portion 61, an operation screen including an icon display area in which a plurality of operation icons are arranged. Here, the process of step S11 is an example of the first step of the present disclosure, and is executed by the first display processing portion 51 of the control portion 5.

For example, when the user selects the copy function on the initial screen and the operation screen display process is started, the control portion 5 displays, on the display portion 61, the operation screen G10 including the icon display area R21 in which the operation icons A11 to A16 related to the copy job are arranged, as shown in FIG. 4. In addition, when the display change tab T14 is operated on the operation screen G10 and the operation screen display process is started, the control portion 5 displays, on the display portion 61, the operation screen G20 including the icon display area R22 in which the operation icons A12, A14, A15, and A21 to A28 related to the copy job are arranged, as shown in FIG. 5. In addition, when the display change key K12 is operated on the operation screen G20 and the operation screen display process is started, the control portion 5 displays, on the display portion 61, the operation screen G30 including the icon display area R23 in which the operation icons A31 to A33 related to the copy job are arranged, as shown in FIG. 6.

<Step S12>

In step S12, the control portion 5 determines whether or not an operation performed on any of the operation icons displayed in step S11 has been detected by the operation detecting portion 62. Specifically, the control portion 5 determines that an operation performed on an operation icon has been detected, when a touch position detected by the operation detecting portion 62 for a touch of an object on the display portion 61, overlaps one of the operation icons arranged in the icon display area in displayed in step S11.

Upon determining that an operation performed on an operation icon has been detected (Yes side at S12), the control portion 5 moves the process to step S13. On the other hand, upon determining that an operation performed on an operation icon has not been detected (No side at S12), the control portion 5 moves the process to step S15.

<Step S13>

In step S13, the control portion 5 executes a process corresponding to the operation icon whose operation was detected in step S12. Here, the process of step S13 is executed by the process executing portion 52 of the control portion 5.

For example, when an operation performed on the operation icon has been detected by the operation detecting portion 62, the control portion 5 displays, on the display portion 61, a setting screen that is used to set a function corresponding to the operation icon whose operation was detected.

It is noted that, when an operation performed on the operation icon has been detected by the operation detecting portion 62, the control portion 5 may execute a process of changing the setting for the function corresponding to the operation icon whose operation was detected.

<Step S14>

In step S14, the control portion 5 identifies operated icons among the plurality of operation icons arranged in the icon display area displayed in step S11. Here, the process of step S14 is an example of the third step of the present disclosure, and is executed by the identification processing portion 53 of the control portion 5.

For example, when, in step S13, a setting screen corresponding to the operation icon whose operation was detected in step S12 is displayed, the control portion 5 identifies each operated icon based on whether or not a setting operation was performed on the setting screen. For example, when the setting change operation is performed on the setting screen, the control portion 5 rewrites a value of a piece of operation status information stored in the RAM, that corresponds to the operated operation icon, to a value indicating "operated".

In addition, when, in step S13, the process of changing the setting of the function corresponding to the operation icon whose operation was detected in step S12, is executed, the control portion 5 may identify the operation icon whose operation was detected in step S12, as an operated icon.

<Step S15>

In step S15, the control portion 5 determines whether or not the call operation has been performed. For example, the control portion 5 determines whether or not the call key 633 has been operated.

Upon determining that the call operation has been performed (Yes side at S15), the control portion 5 moves the process to step S16. On the other hand, upon determining that the call operation has not been performed (No side at S15), the control portion 5 moves the process to step S18.

<Step S16>

In step S16, the control portion 5 sets the display position of the keyboard displayed on the display portion 61. Here, the process of step S16 is an example of the fourth step of the present disclosure, and is executed by the display position setting portion 55 of the control portion 5.

Specifically, in a case where the keyboard can be displayed in a state of not being overlapped on any of the operation icons arranged in the icon display area, the control portion 5 sets the display position of the keyboard to a position where the keyboard is not overlapped on any of the operation icons arranged in the icon display area.

In addition, in a case where the keyboard is inevitably displayed in a state of being overlapped on any of the operation icons arranged in the icon display area, and there are one or more operated icons among the plurality of operation icons arranged in the icon display area, the control portion 5 sets the display position of the keyboard to a position where the keyboard is overlapped on a part or the whole of at least one of the operated icons. For example, the control portion 5 sets the display position of the keyboard to a position where the smallest number of unoperated icons are overlapped, in part or wholly, with the keyboard. With this configuration, the number of unoperated icons hidden under the keyboard displayed on the display portion 61 is reduced. Accordingly, this makes it possible to prevent an occurrence of a state where the user needs to perform an operation for changing the display position of the keyboard or ending the display of the keyboard once, so as to operate an unoperated icon hidden under the keyboard.

In addition, in a case where the keyboard is inevitably displayed in a state of being overlapped on any of the operation icons arranged in the icon display area, and there is no operated icon among the plurality of operation icons arranged in the icon display area, the control portion 5 sets the display position of the keyboard to a position where the smallest number of operation icons are overlapped, in part or wholly, with the keyboard. With this configuration, the number of operation icons hidden under the keyboard displayed on the display portion 61 is reduced. Accordingly, this makes it possible to prevent an occurrence of a state where the user needs to perform an operation for changing the display position of the keyboard or ending the display of the keyboard once, so as to operate an operation icon hidden under the keyboard.

<Step S17>

In step S17, the control portion 5 displays, on the display portion 61, the keyboard in a state of being overlapped on a part of the icon display area, at the display position set in step S16. Here, the process of step S17 is an example of the second step of the present disclosure, and is executed by the second display processing portion 54 of the control portion 5.

Figure 8:
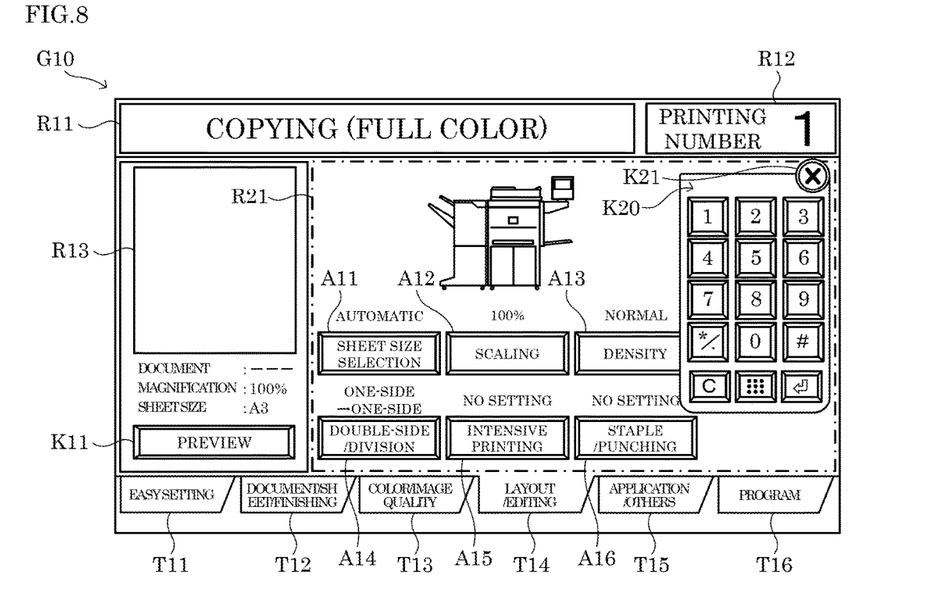
FIG. 8 shows an example of a keyboard displayed on the display portion of the image processing apparatus according to the embodiment of the present disclosure.

FIG. 8 shows an example of the keyboard displayed in step S17 when the operation screen G10 shown in FIG. 4 is displayed in step S11.

On the operation screen G10 shown in FIG. 4, the keyboard K20 is inevitably displayed in a state of being overlapped on any of the operation icons arranged in the icon display area R21. In addition, on the operation screen G10 shown in FIG. 4, there is no operated icon among the plurality of operation icons arranged in the icon display area R21. As a result, on the operation screen G10 shown in FIG. 8, the keyboard K20 is displayed at a position where the smallest number of operation icons are overlapped, in part or wholly, with the keyboard K20. Specifically, on the operation screen G10 shown in FIG. 8, the keyboard K20 is displayed at a position where the keyboard K20 is overlapped on only a part of the operation icon A13.

It is noted that the display position of the keyboard K20 displayed on the operation screen G10 can be moved in response to an operation, such as a swipe operation, performed by the user. In addition, the keyboard K20 can be erased from the operation screen G10 in response to an operation of an erase key K21 shown in FIG. 8. It is noted that the keyboard K20 may be erased from the operation screen G10 in response to an operation of the call key 633. In a case where the operation icons in the icon display area R21 in the operation screen G10 are rearranged in response to a display of the keyboard K20, the arrangement of the operation icons in the icon display area R21 may be returned to the original arrangement when the keyboard K20 is erased from the operation screen G10.

Figure 9:
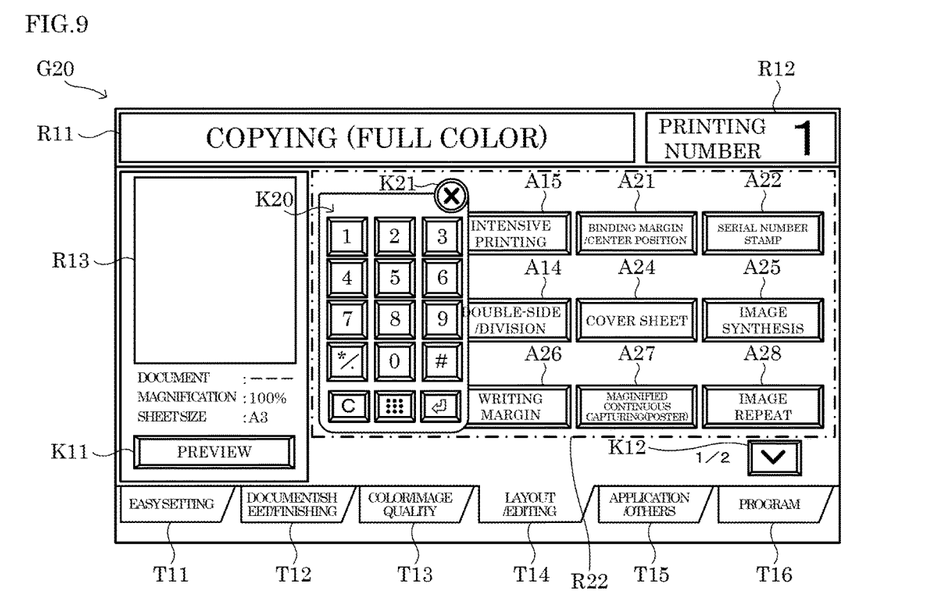
FIG. 9 shows an example of the keyboard displayed on the display portion of the image processing apparatus according to the embodiment of the present disclosure.

FIG. 9 shows an example of the keyboard displayed in step S17 when the operation screen G20 shown in FIG. 5 is displayed in step S11.

On the operation screen G20 shown in FIG. 5, the keyboard K20 is inevitably displayed in a state of being overlapped on any of the operation icons arranged in the icon display area R22. In addition, on the operation screen G20 shown in FIG. 9, among the plurality of operation icons arranged in the icon display area R22, operation icons A12, A15, and A21 to A22 have been identified as operated icons by the identification processing portion 53. As a result, on the operation screen G20 shown in FIG. 9, the keyboard K20 is displayed at a position where the smallest number of unoperated icons are overlapped, in part or wholly, with the keyboard K20. Specifically, on the operation screen G20 shown in FIG. 9, the keyboard K20 is displayed at a position where the keyboard K20 is overlapped on the whole of the operation icon A12, the whole of the operation icon A23, a part of the operation icon A14, a part of the operation icon A15, and a part of the operation icon A26.

Figure 10:
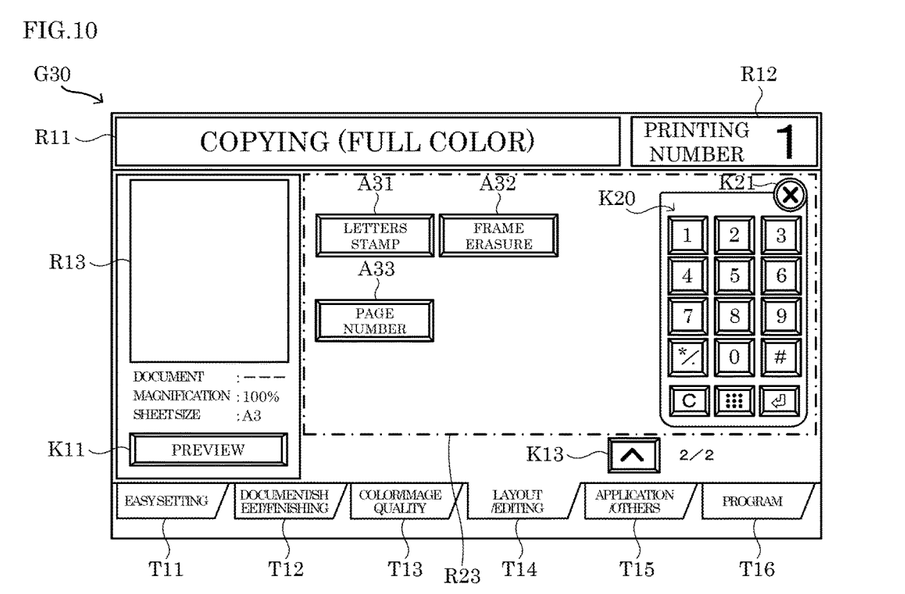
FIG. 10 shows an example of the keyboard displayed on the display portion of the image processing apparatus according to the embodiment of the present disclosure.

FIG. 10 shows an example of the keyboard displayed in step S17 when the operation screen G30 shown in FIG. 6 is displayed in step S11.

On the operation screen G30 shown in FIG. 6, the keyboard K20 can be displayed in a state of not being overlapped on any of the operation icons arranged in the icon display area R23. As a result, on the operation screen G30 shown in FIG. 10, the keyboard K20 is displayed in a state of not being overlapped on any of the operation icons arranged in the icon display area R23.

<Step S18>

In step S18, the control portion 5 determines whether or not the operation of the user performed on the operation screen displayed in step S11 has been completed.

For example, the control portion 5 determines that the operation of the user performed on the operation screen has been completed when a user operation, such as an operation performed on any of the display change tabs T11 to T16, has been performed to change the operation icons displayed on the operation screen. In addition, the control portion 5 determines that the operation of the user performed on the operation screen has been completed when the power source key 631 or the start key 632 has been operated.

Upon determining that the operation of the user performed on the operation screen has been completed (Yes side at S18), the control portion 5 ends the operation screen display process. On the other hand, upon determining that the operation of the user performed on the operation screen has not been completed (No side at S18), the control portion 5 moves the process to step S12. In step S12, the control portion 5 waits for an operation performed on any of the operation icons or the call operation until it determines that the operation of the user performed on the operation screen has been completed.

It is noted that when a user operation is performed in step S18 to change the operation icons displayed on the operation screen, the control portion 5 executes, in response to the user operation, another operation screen display process corresponding to the operation screen displayed on the display portion 61. It is noted that when a user operation is performed in step S18 to change the operation icons displayed on the operation screen, the control portion 5 may reset, to the initial values, the values held in the operation status information stored in the predetermined storage area of the RAM.

In addition, when an operation of the start key 632 is detected in step S18, the control portion 5 executes a job, such as a copy job, in accordance with the details set on the operation screen and the setting screen. In addition, the control portion 5 resets, to the initial values, the values held in the operation status information stored in the predetermined storage area of the RAM.

In addition, when an operation of the power source key 631 is detected in step S18, the control portion 5 switches the action mode to the energy-saving mode so as to stop the power supply to the operation/display portion 6. It is noted that when an operation of the power source key 631 is detected in step S18, the control portion 5 may reset, to the initial values, the values held in the operation status information stored in the predetermined storage area of the RAM.

As described above, in the operation screen display process, when there are one or more operated icons among the plurality of operation icons arranged in the icon display area, the display position of the keyboard displayed by the second display processing portion 54 can be set to a position where the keyboard is overlapped on a part or the whole of at least one of the operated icons. With this configuration, the number of unoperated icons hidden under the keyboard displayed on the display portion 61 is reduced. Accordingly, this makes it possible to reduce troublesome user operation when the keyboard is displayed on the display portion 61.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus comprising:
   either one or both of an image reading portion and an image forming portion, the image reading portion being configured to read image data from a document sheet, the image forming portion being configured to form an image based on image data; and
   a display input device including:
      an operation display portion including a display portion and an operation detecting portion, the operation detecting portion being configured to detect an operation performed on the display portion; and
      a control portion including a CPU, wherein
   the control portion executes:
      a first display step of displaying, on the display portion, an icon display area in which a plurality of operation icons are arranged;
      a second display step of, when a predetermined call operation is performed, displaying, on the display portion, a keyboard in a state of being overlapped on a part of the icon display area;
      an identification step of identifying, among the plurality of operation icons arranged in the icon display area, one or more operated icons that were already operated during a predetermined operation period; and
      a display position setting step of, in a case where there are one or more operated icons among the plurality of operation icons arranged in the icon display area, setting either one or both of: display positions of the plurality of operation icons displayed in the first display step; and a display position of the keyboard displayed in the second display step, to such positions where the keyboard is overlapped on a part or whole of at least one of the operated icons; and
   wherein
   the operation icons are used to set contents of processes that are executed by either one or both of the image reading portion and the image forming portion.

2. The image processing apparatus according to claim 1, wherein in a case where the keyboard is inevitably displayed in a state of being overlapped on any of the operation icons arranged in the icon display area, the control portion, in the display position setting step, sets either one or both of: the display positions of the plurality of operation icons displayed in the first display step, and the display position of the keyboard displayed in the second display step, to such positions where the keyboard is overlapped on a part or whole of at least one of the operated icons.

3. The image processing apparatus according to claim 1, wherein in a case where there is no operated icon among the plurality of operation icons arranged in the icon display area, the control portion, in the display position setting step, sets the display position of the keyboard displayed in the second display step to such a position where the smallest number of operation icons are overlapped, in part or wholly, with the keyboard.

4. The image processing apparatus according to claim 1, wherein in a case where there are one or more operated icons among the plurality of operation icons arranged in the icon display area, the control portion, in the display position setting step, sets the display position of the keyboard displayed in the second display step to such a position where the smallest number of unoperated icons are overlapped, in part or wholly, with the keyboard.

5. The image processing apparatus according to claim 1, wherein in a case where there are one or more operated icons among the plurality of operation icons arranged in the icon display area, the control portion, in the display position setting step, sets the display positions of the plurality of operation icons displayed in the first display step to such positions where the smallest number of unoperated icons are overlapped, in part or wholly, with the keyboard.

6. The image processing apparatus according to claim 1, wherein the control portion further executes:

a third display step of, when the operation detecting portion has detected that an operation was performed on an operation icon among the plurality of operation icons, displaying, on the display portion, a setting screen on which a setting operation of setting a function corresponding to the operation icon is performed, and the control portion, in the identification step, identifies the one or more operated icons based on whether or not a setting operation was performed on the setting screen.

7. A display input method executed in an image processing apparatus including a display input device including an operation display portion that includes a display portion and an operation detecting portion, the operation detecting portion being configured to detect an operation performed on the display portion, the display input device further including either one or both of an image reading portion and an image forming portion, the image reading portion being configured to read image data from a document sheet, the image forming portion being configured to form an image based on image data, the display input method comprising:

a first step of displaying, on the display portion, an icon display area in which a plurality of operation icons are arranged;

a second step of, when a predetermined call operation is performed, displaying, on the display portion, a keyboard in a state of being overlapped on a part of the icon display area;

a third step of identifying, among the plurality of operation icons arranged in the icon display area, one or more operated icons that were already operated during a predetermined operation period; and a fourth step of, in a case where there are one or more operated icons among the plurality of operation icons arranged in the icon display area, setting either one or both of: display positions of the plurality of operation icons displayed in the first display step, and a display position of the keyboard displayed in the second display step, to such positions where the keyboard is overlapped on a part or whole of at least one of the operated icons;

wherein the operation icons are used to set contents of processes that are executed by either one or both of the image reading portion and the image forming portion.

* * * * *